(12) United States Patent
Mabry et al.

(10) Patent No.: US 6,352,618 B1
(45) Date of Patent: *Mar. 5, 2002

(54) MODULAR SOLVENT RECOVERY DEVICE

(75) Inventors: Michael D. Mabry, Marietta; Donald R. McAllister, Atlanta, both of GA (US)

(73) Assignee: IHS Solvent Solutions, Inc., Ball Ground, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/151,222

(22) Filed: Sep. 10, 1998

(51) Int. Cl.$^7$ ................................................ B01D 3/34
(52) U.S. Cl. .................. 203/6; 159/47.3; 159/DIG. 20; 203/68; 203/69; 203/70; 203/100
(58) Field of Search ............................... 203/6, 68, 70, 203/69, 57, 100, DIG. 25, 48; 159/47.3, DIG. 20; 101/487

(56) References Cited

U.S. PATENT DOCUMENTS

| | | | | |
|---|---|---|---|---|
| 3,436,318 A | * | 4/1969 | Glass ........................... 203/52 |
| 4,204,913 A | * | 5/1980 | Sabatka .......................... 203/2 |
| 4,488,933 A | * | 12/1984 | Claunch et al. .............. 203/100 |
| 4,666,562 A | * | 5/1987 | Nelson .......................... 203/93 |
| 4,693,786 A | * | 9/1987 | Brett et al. ................... 203/100 |
| 5,308,452 A | | 5/1994 | Marks et al. ................ 202/164 |
| 5,429,720 A | * | 7/1995 | Mertens et al. ................ 203/67 |

* cited by examiner

Primary Examiner—Virginia Manoharan
(74) Attorney, Agent, or Firm—Kilpatrick Stockton LLP

(57) ABSTRACT

A process is disclosed for manufacturing a concentrated residue from a photopolymer fluid which includes photopolymer and photopolymer solvent. The photopolymer fluid may be derived by chemically etching a photopolymer layer of a printing plate with a solvent. The process includes distilling the photopolymer fluid to recover the solvent and concentrate the photopolymer fluid to form a concentrated photopolymer residue, and mixing a flash-point-increasing agent with the concentrated photopolymer residue in an amount sufficient to raise the flash point temperature of the concentrated photopolymer residue to a pre-selected temperature to form the concentrated residue. The flash-point-increasing agent may be mixed with the waste photopolymer fluid prior, during, or after distillation. Also, the flash-point-increasing agent includes oils, such as paraffinic and naphthenic oils and a blend thereof.

15 Claims, 12 Drawing Sheets

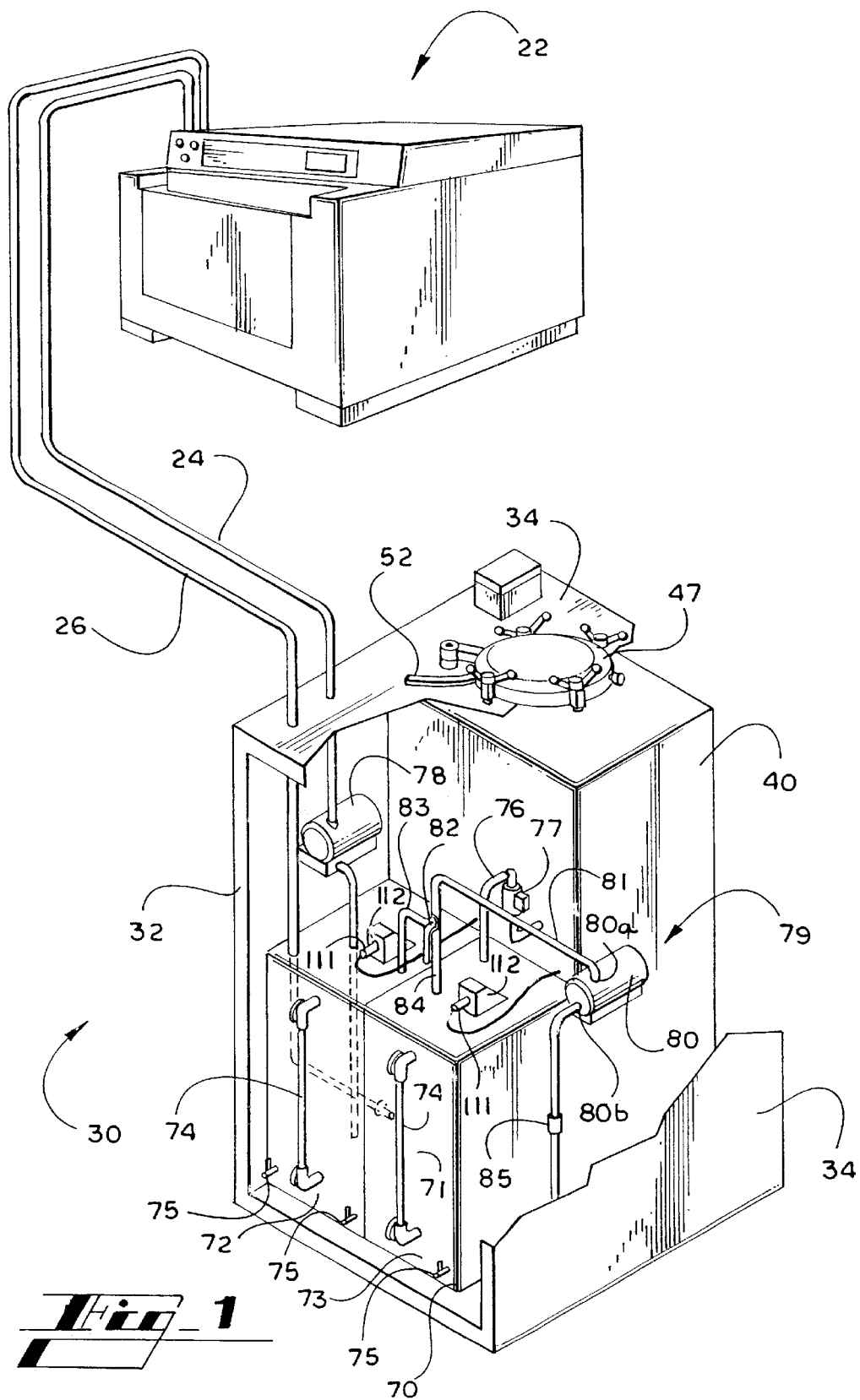
Fig_1

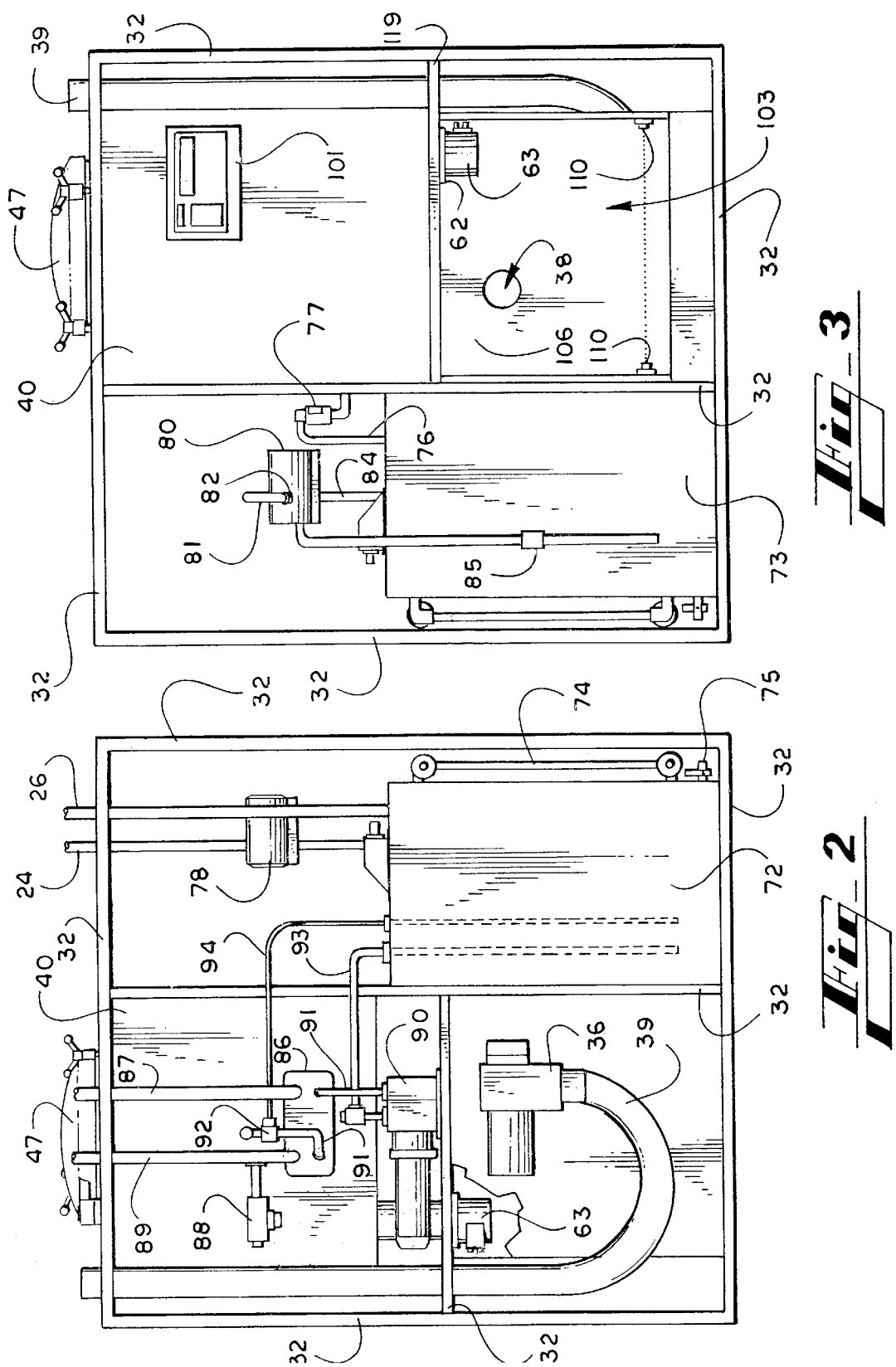

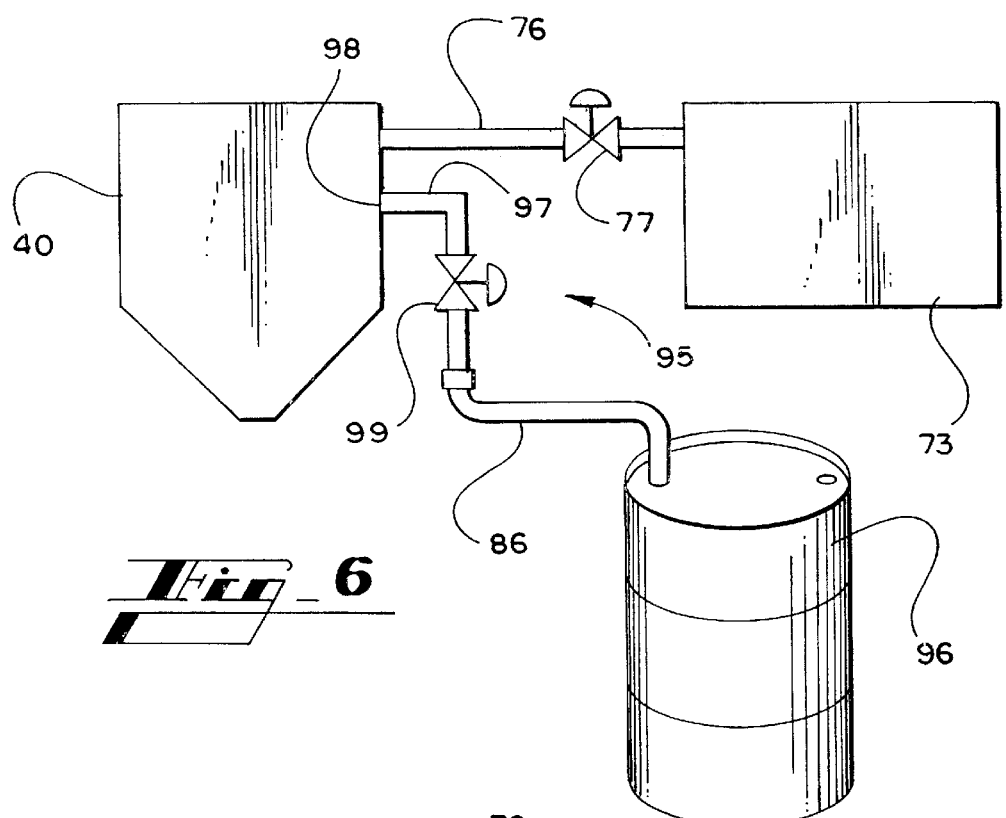
Fig_6
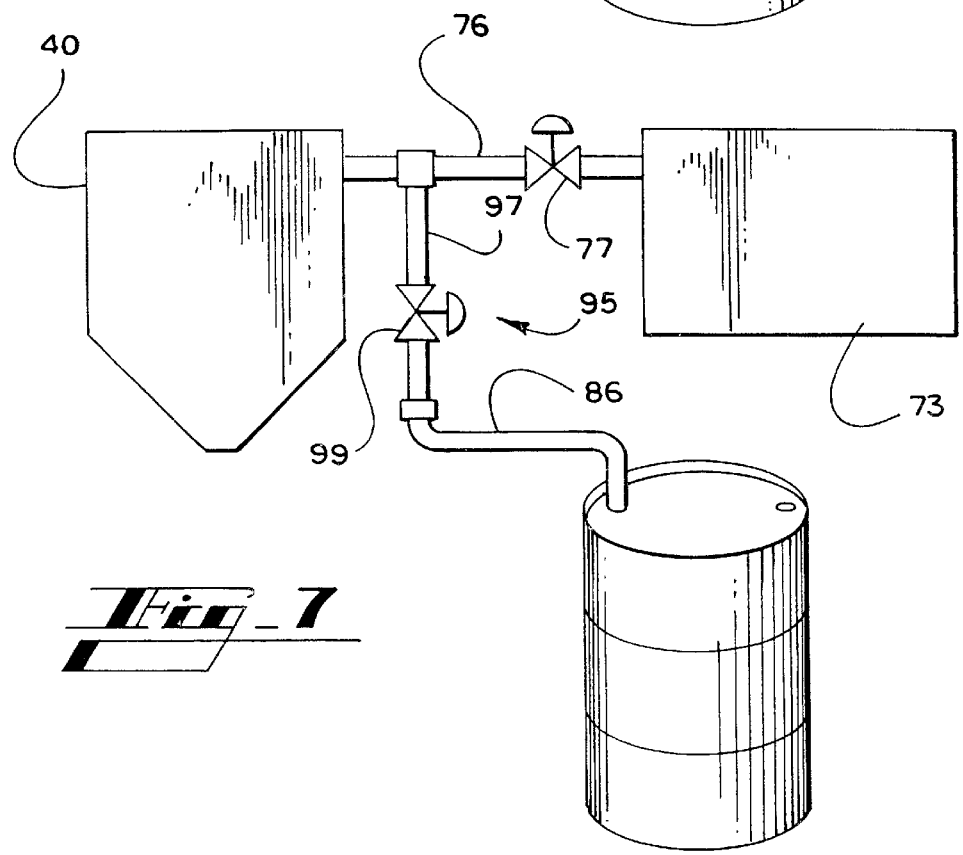
Fig_7

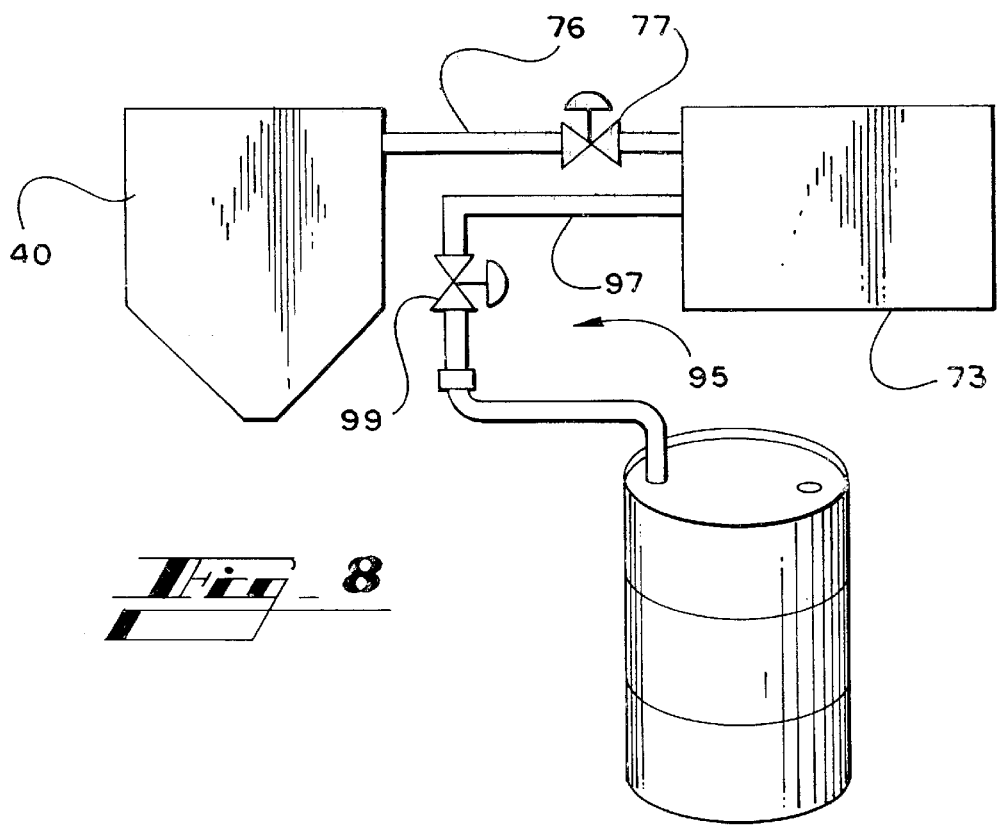
Fig_8
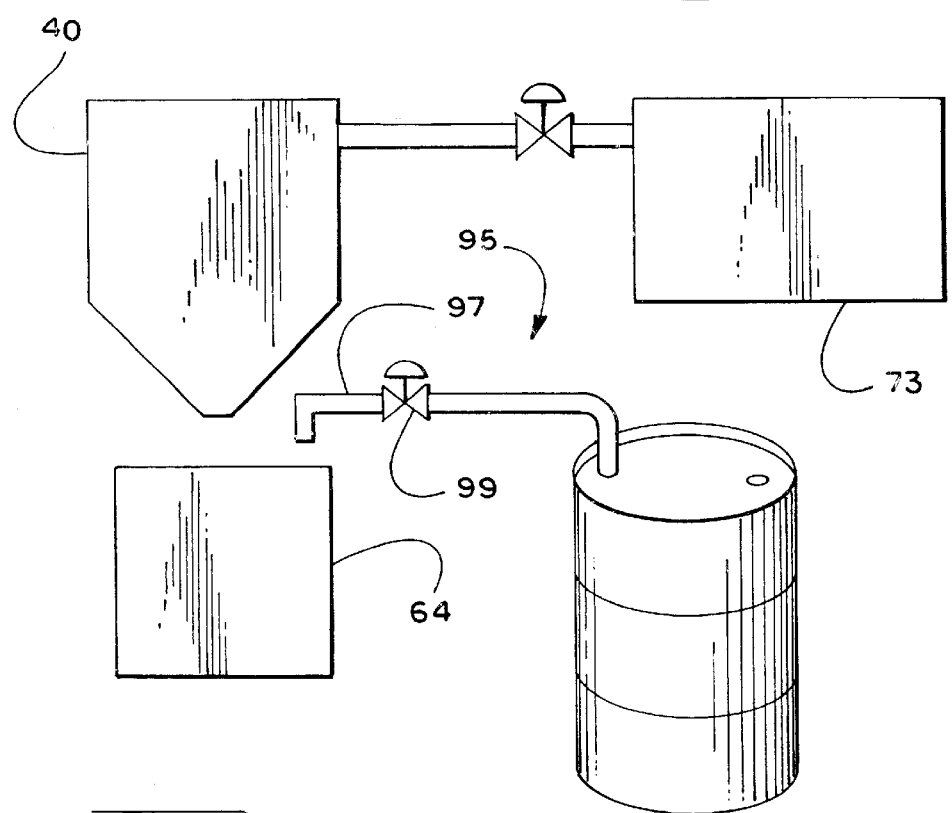
Fig_9

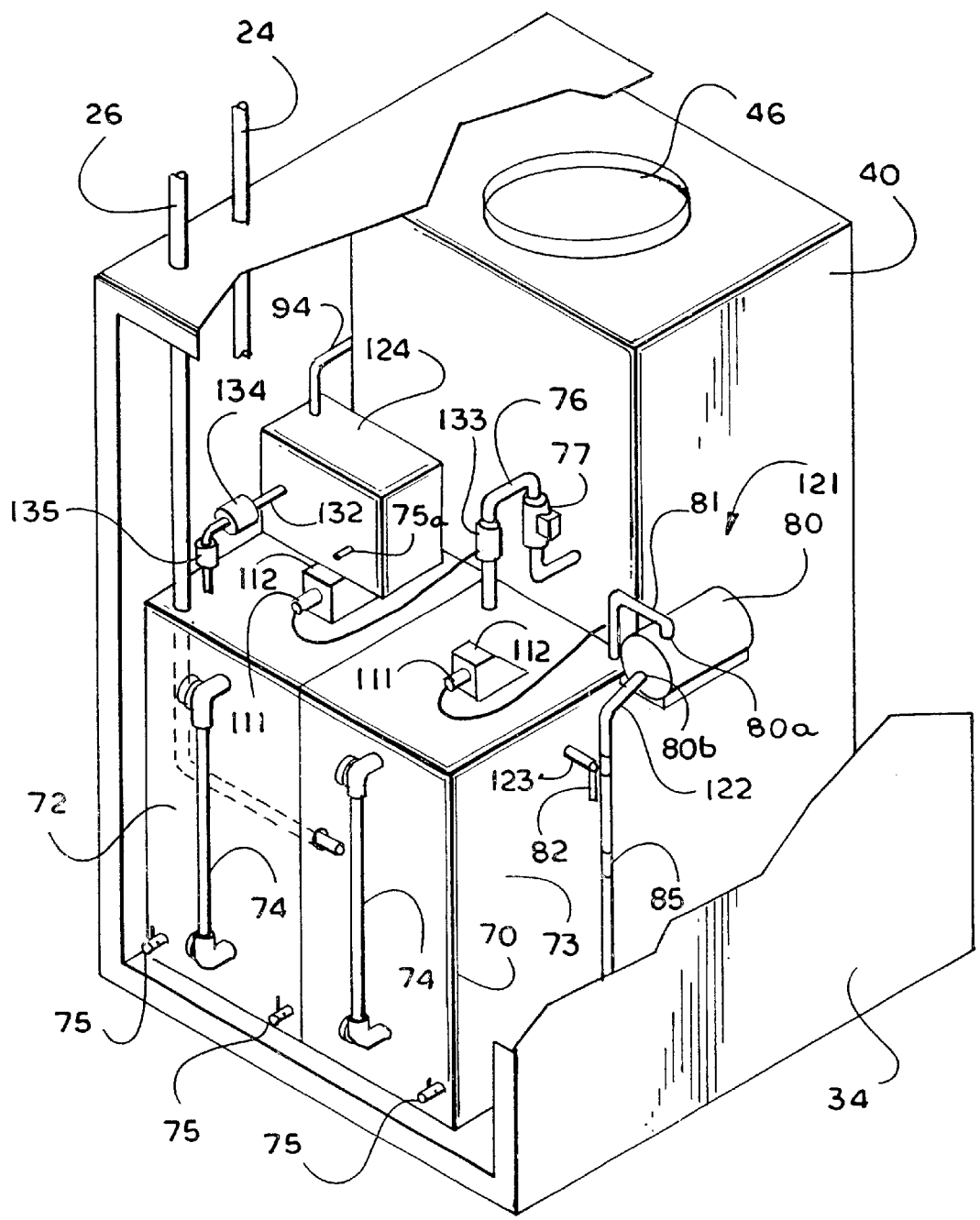
Fig_11

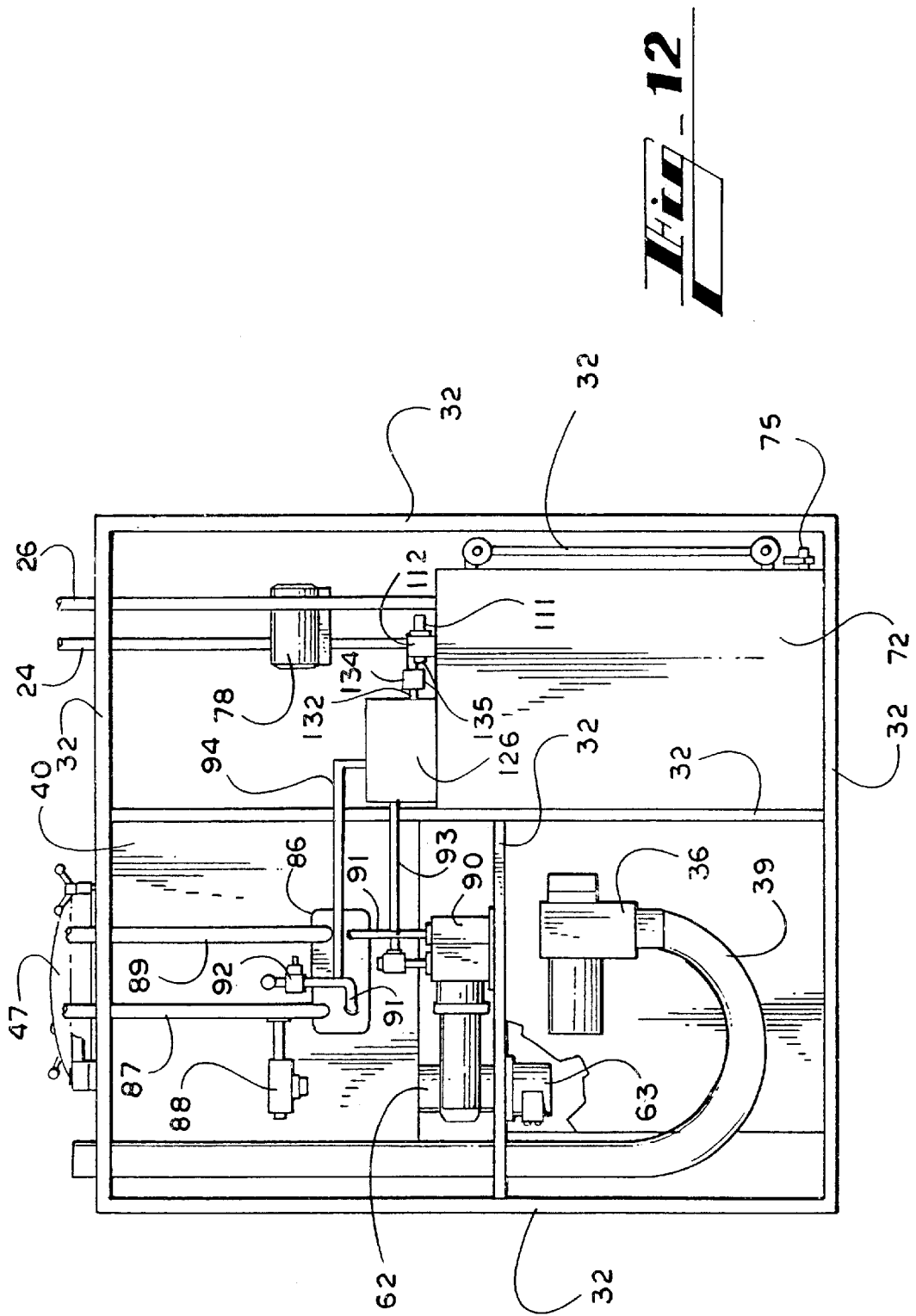

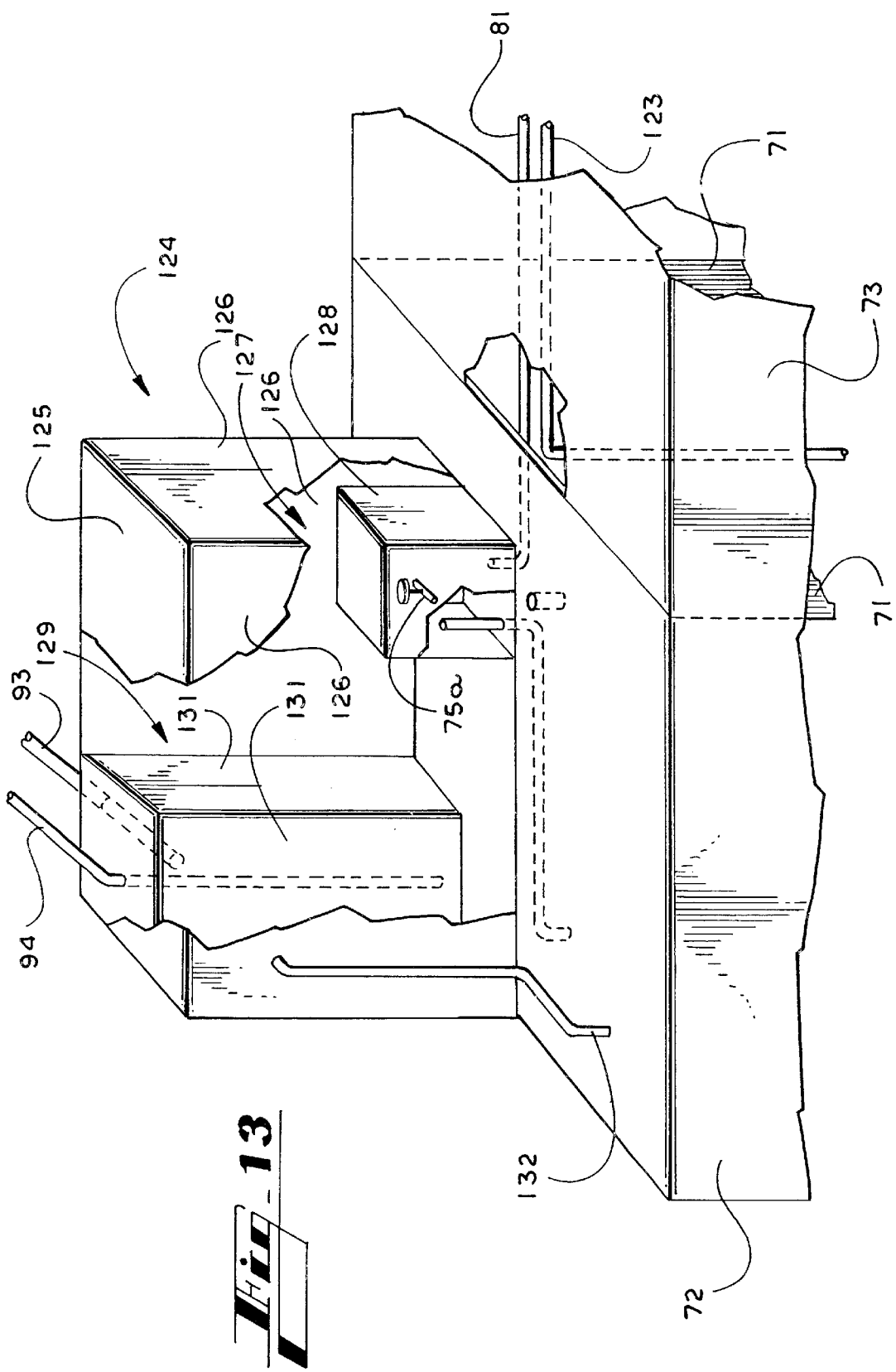

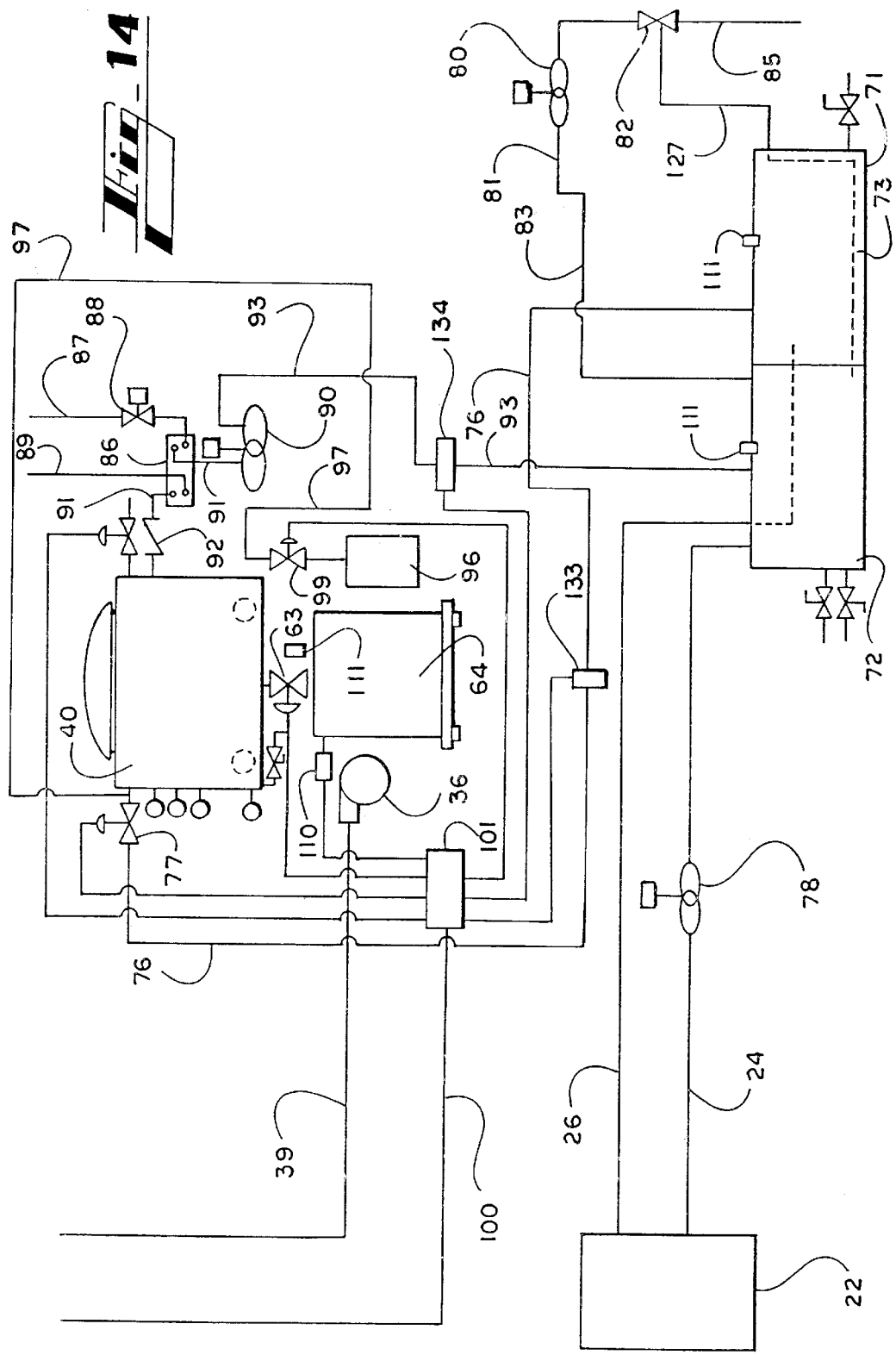

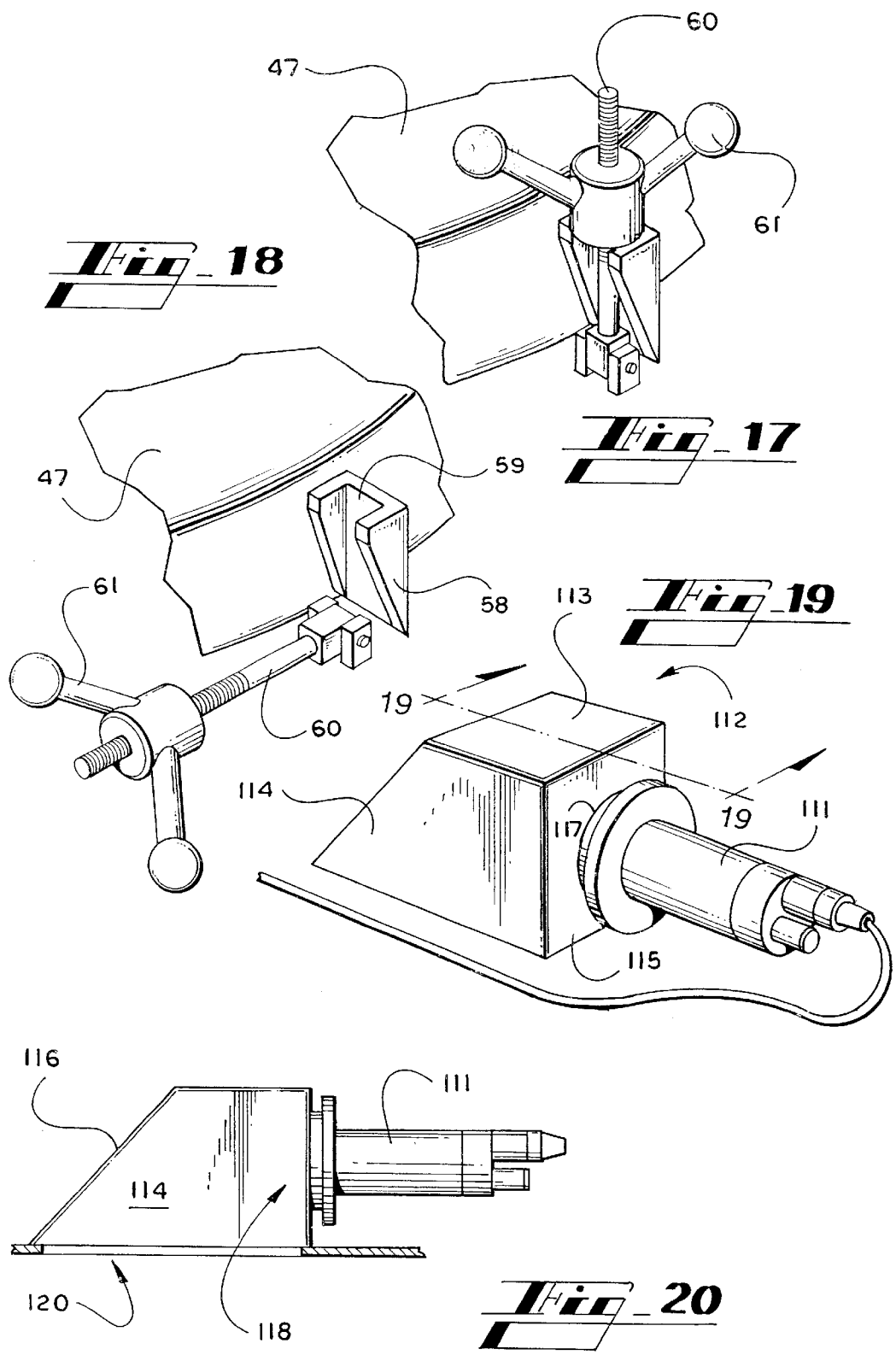

MODULAR SOLVENT RECOVERY DEVICE

BACKGROUND OF THE INVENTION

I. Field of the Invention

The present invention relates generally to the field of solvent recovery devices. More particularly, the present invention relates to a device and method for recovering a solvent utilized in photopolymer plate processing operations.

II. Description of the Related Art

It is known in the prior art to produce printing plates from acrylic elastomer resins and synthetic rubbers utilizing photoengraving and chemical milling techniques. Generally, a layer of such resins or rubbers are placed onto a surface of a flexible plate and then exposed to light through a photographic film or stencil having a desired pattern to be formed onto the printing plate. Exposure of the resins and rubbers to light cures the resins and rubbers, altering the susceptibility of the resins and rubbers to removal by a photopolymer solvent. By applying the photopolymer solvent to the light exposed layer of resins or rubbers on the printing plate, the uncured photopolymer resin or rubber is chemically etched away by the photopolymer solvent in a pattern reverse to that of the film or stencil. The resin or rubber etched from the plate is removed with the waste photopolymer fluid.

Typically, the solvents utilized for the photopolymer solvent are relatively costly and generally have flash point temperatures above 140° F., defining the photopolymer solvent as a Class III liquid in accordance with 29 CFR 1910.106(a)(18)(ii). Further, disposal of the waste photopolymer fluid is likewise relatively expensive and presents environmental problems and concerns. Therefore, to more efficiently produce the aforementioned printing plates, devices were developed to recover the photopolymer solvent from the waste photopolymer fluid.

Prior art photopolymer solvent recovery devices utilize vacuum assisted distillation to separate the photopolymer solvent from the photopolymer resins or rubbers. Upon separation and removal of the photopolymer solvent, the residue resins or rubbers remain in the device as a concentrated residue. Typically, the residue is removed from the device by gravity flow through a drain. One problem with this device is that recovery of the photopolymer solvent is limited. To maintain fluidity of the concentrated residue, a certain amount of photopolymer washout fluid must remain in the residue, otherwise the resins or rubbers will coalesce into an amorphous solid within the device. Once the solid is formed, the device can not be operated until the operator enters and manually removes the solid from the device. This is undesirable because it is both time-consuming and exposes the operator to the chemicals comprising the waste photopolymer fluid. Further, it has been discovered that the concentrated residue has a flash point temperature between 100 and 140° F., defining the residue as Class II liquid in accordance with 29 CFR 1910.106(a)(18)(i). Not only is the residue a potential fire hazard, particularly as the residue is drained from the device at an elevated temperature, its disposal is subject to special handling requirements which increase disposal expenses, as compared to a Class III liquid.

In the photopolymer solvent recovery industry, efforts to date are directed to maintaining residue fluidity while maximizing solvent recovery. These efforts resulted in the development of a device utilizing a surrogate solvent to maintain residue fluidity. The surrogate solvent is added to the device during vacuum assisted distillation to replace the photopolymer solvent being separated and removed from the waste photopolymer fluid. The surrogate solvent maintains the photopolymer resins and rubbers in concentrated solution by coating the acrylic elastomer particles to prevent cross linking and vulcanization, thereby preventing coalescence of the residue as the photopolymer solvent fluid is removed. Even after the residue cools, the residue remains a liquid. Also, by utilizing a low cost surrogate solvent, the economic efficiency of the device is increased due to higher photopolymer solvent recovery. An example of such a device is described in U.S. Pat. No. 5,308,452.

Once the distillation process is completed, it is desirable to remove the concentrated residue from the device as soon as possible. However, a fire hazard exists if the flash point temperature of the concentrated residue is below 140° F. As hot concentrated residue is drained from the device, the residue presents a fire hazard due to tribal chain electrical reaction with some prior art devices, particularly when the device is operating at a relatively high distillation temperature. Due to the heat of the residue, the air and vapors proximate to the draining, hot residue expands rapidly and generates static electricity as the gaseous molecules move past one another. Although the device may be grounded, electrical discharge can occur across the gaseous molecules themselves, generating a spark to ignite the vapors and the residue. As a safety precaution, some prior art devices permit the concentrated residue to cool within the device prior to draining. Again, this is undesirable due to the risk of the concentrated residue solidifying in the device, and the device can not renew distillation operations until the device is drained of the concentrated residue.

Thus, there remains a need for a device for separating photopolymer solvent from waste photopolymer fluid which maximizes solvent recovery while producing a coalescable concentrated residue having a flash point temperature in excess of 140° F. Accordingly, it is to the provision of such that the present invention is primarily directed.

SUMMARY OF THE INVENTION

This invention overcomes the disadvantages of the prior art by providing a modular solvent recovery device that is simple in design and construction, relatively inexpensive to fabricate and easy to use. The modular solvent recovery device is readily transportable and connectable to a conventional plate processor without any modifications to the plate processor. The device includes an enclosure which provides access to the device interior. A frame supports a tank having a solvent section and a waste fluid section. The waste fluid section receives waste photopolymer fluid directly from the plate processor, and because the device is automated, the device is capable of receiving the waste photopolymer fluid on a continuous basis. Recovered solvent is transported directly to the plate processor from the solvent section. A still receives waste photopolymer fluid from the waste fluid section of the tank and distills the waste photopolymer fluid by application of heat and vacuum pressure thereto to separate and recover a desired solvent from the waste photopolymer fluid and reduce the waste photopolymer fluid to a concentrated residue. The device employs a novel flash-point-increasing agent delivery system to supply a flash-point-increasing agent to the concentrated residue in an amount sufficient to raise the flash point temperature of the concentrated residue to a predetermined temperature. This novel process enables the flash point temperature of the concentrated residue to be raised to a temperature that qualifies the concentrated residue, if maintained as a liquid through reduced solvent recovery, to be classified as a Class III residue. Importantly, this novel process permits almost complete recovery of the solvent while maintaining flowability of the coalescing concentrated residue. Further, the concentrated residue can be drained immediately after distillation operations cease without risk of fire due to tribal chain electrical reaction.

The still has a novel manhole device to removably seal a manhole of the still. The manhole device comprises a pivotally and telescopically mounted closure having wheels rotatably mounted thereto. Tracks are mounted to the still to engage the wheels and raise the closure vertically above a manhole of the still upon pivotal movement of the closure.

The modular solvent recovery device utilizes an ultrasonic sensor to detect fluid levels in the tank and residue level in a residue container. A housing is provided to enclose ultrasonic fluid level sensors.

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Other advantages and capabilities of the invention will become apparent from the following description taken in conjunction with the accompanying drawings showing preferred embodiments of the invention.

BRIEF DESCRIPTION OF THE DRAWINGS

The invention will be better understood and the above objects as well as objects other than those set forth above will become apparent when consideration is given to the following detailed description thereof. Such description makes reference to the annexed drawings wherein:

FIG. 1 is a perspective view of a modular solvent recovery device made in accordance with the present invention in fluid communication with a plate processor;

FIG. 2 is one side elevation view of the device of FIG. 1 illustrating a condenser in fluid communication with a tank;

FIG. 3 is another side elevation view of the device of FIG. 1 illustrating a drum cavity;

FIG. 6 is a schematic representation of a container of a flash-point-increasing agent in fluid communication with the still;

FIG. 7 is a schematic representation of the container of the flash-point-increasing agent operatively disposed and in fluid communication between the still and a waste fluid section of the tank;

FIG. 8 is a schematic representation of the container of the flash-point-increasing agent in fluid communication with the waste fluid section of the tank;

FIG. 9 is a schematic representation of the container of the flash-point-increasing agent operatively disposed to provide the flash-point-increasing agent to a residue drum;

FIG. 11 is a partial perspective view of another embodiment of the present invention;

FIG. 12 is a rear elevation view of the device of FIG. 11 illustrating the condenser in fluid communication with a reservoir;

FIG. 13 is a partial perspective view of the reservoir;

FIG. 14 is a schematic representation of the component parts that make up the embodiment of the device of FIG. 11 and their interconnections with each other;

FIG. 17 is a partial perspective view of a clamp engaging the closure;

FIG. 18 is a partial perspective view of the clamp pivoted away from the closure;

FIG. 19 is a perspective view of a ultrasonic sensor housing made in accordance with the present invention; and FIG. 20 is a side elevation, section view of the housing of FIG. 19 taken along line 19—19.

Figure 10:
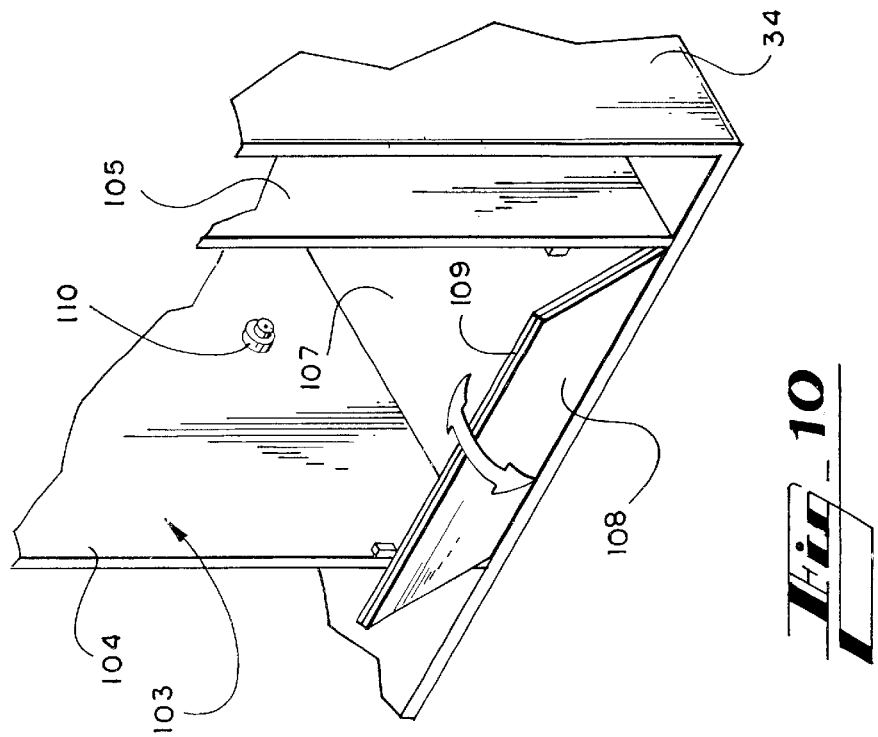
FIG. 10 is a perspective view of the drum cavity and a retaining door.
Figure 4:
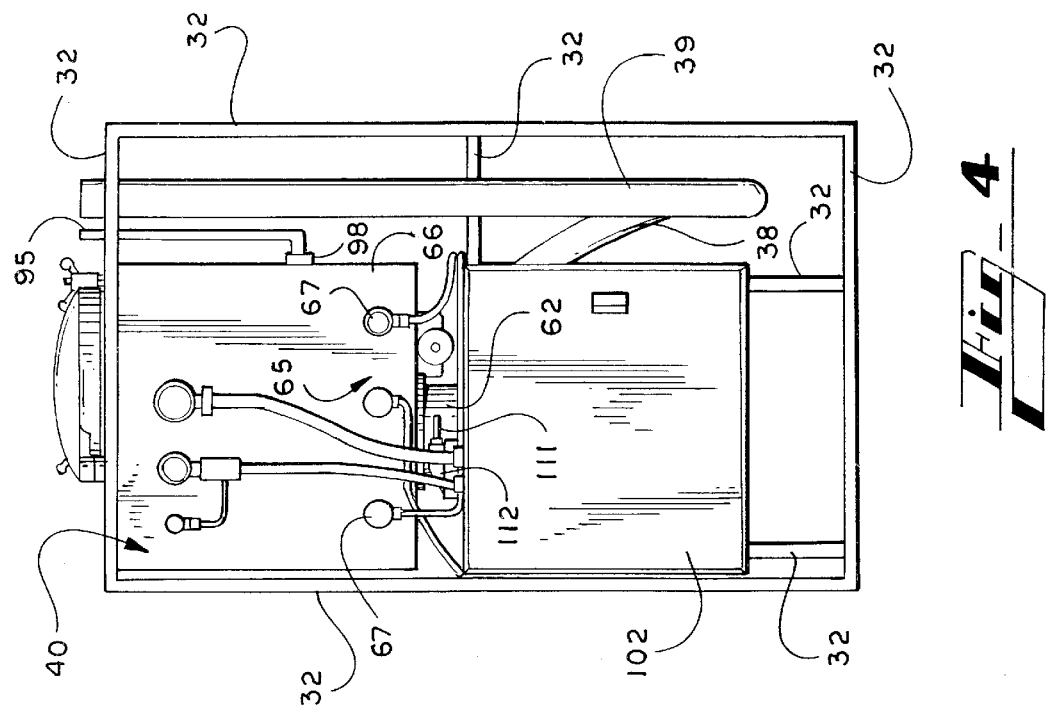
FIG. 4 is a front elevation view of the device of FIG. 1 illustrating heaters and a still.
Figure 5:
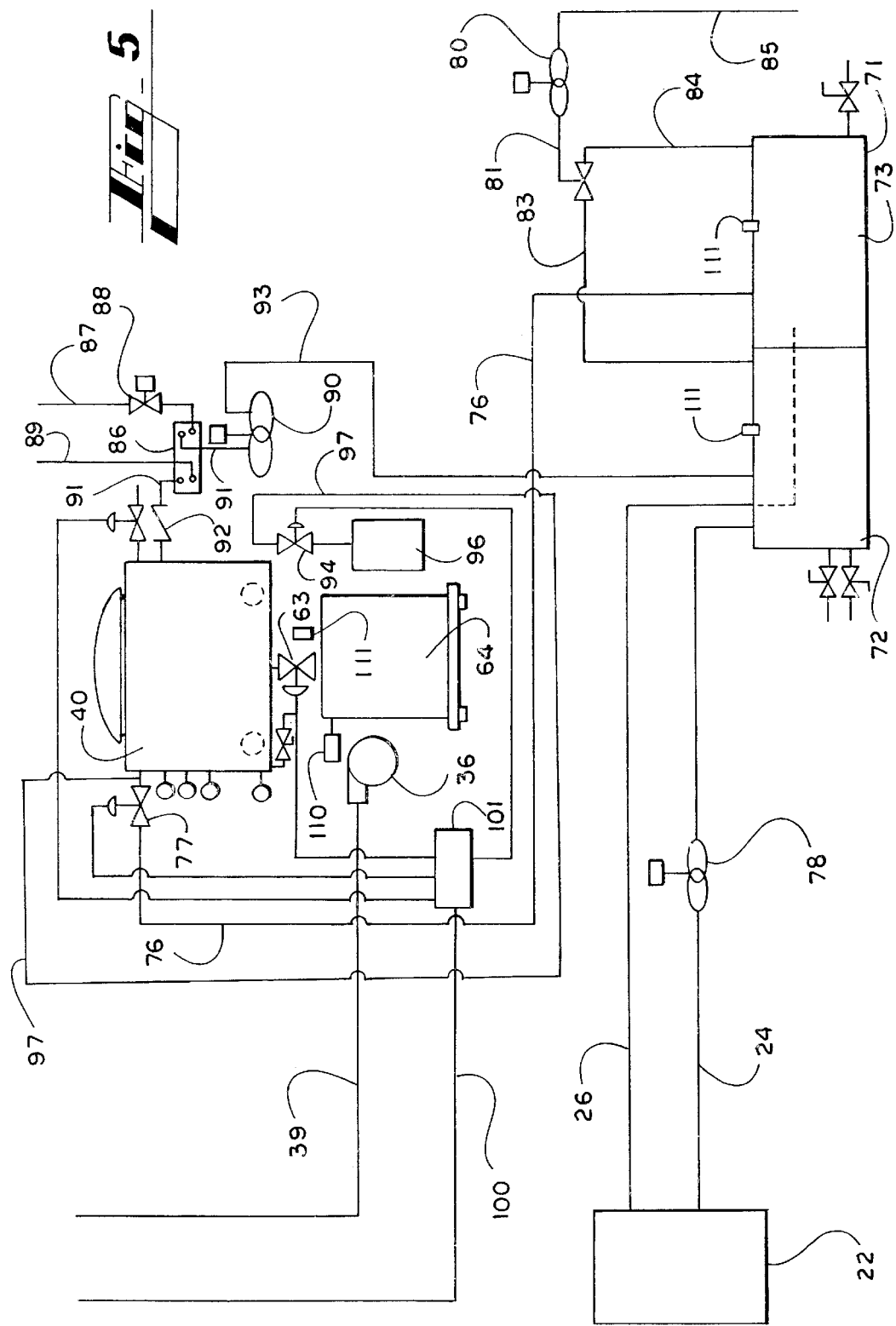
FIG. 5 is a schematic representation of the component parts that make up the embodiment of the device of FIG. 1 and their interconnections with each other.
Figure 15:
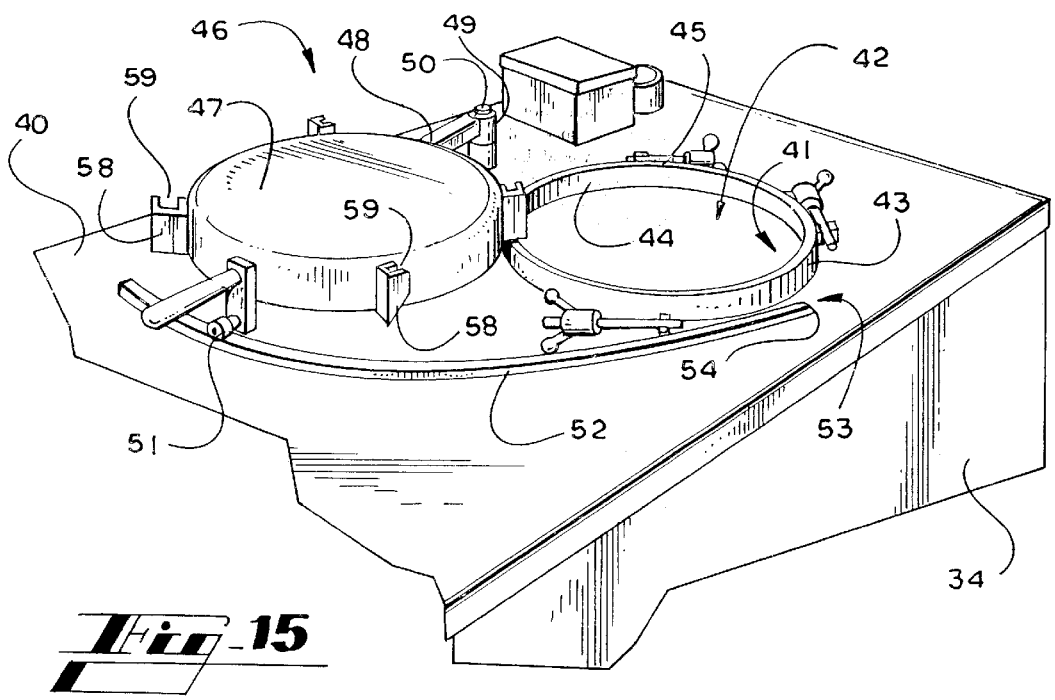
FIG. 15 is a partial perspective view of a manhole device made in accordance with the present invention with a closure pivoted away from a manhole.
Figure 16:
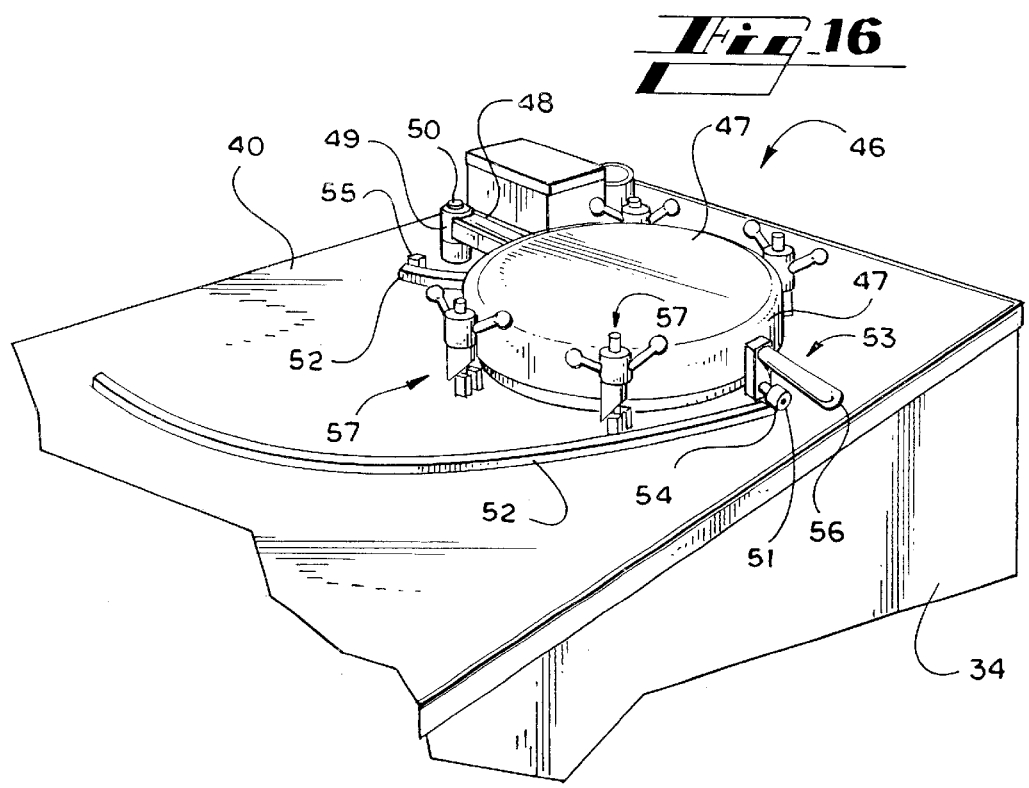
FIG. 16 is a partial perspective view of the closure sealably engaging the flange.

The reference numbers in the drawings relate to the following:

22=plate processor
24=solvent feed conduit
26=waste photopolymer fluid conduit
30=modular solvent recovery device
32=frame
34=enclosure
36=exhaust fan
38=suction hole
39=exhaust hose
40=still
41=still interior
42=manhole
43=flange
44=inner periphery of flange
45=rim of flange
46=manhole device
47=closure
48=arm of closure
49=mounting cylinder of closure
50=rod
51=wheel
52=track
53=proximal end of track
54=shoulder of track
55=stop
56=handle
57=clamp
58=receiver
59=slot of receiver
60=bolt
61=nut
62=dump opening
63=dump valve
64=residue container
65=heating assembly
66=jacket of heating assembly 67=heater
70=tank
71=partition
72=solvent section of tank
73=waste fluid section of tank
74=liquid level sight glass
75=drain valve
75a=sample port valve
76=waste fluid feed conduit
77=control valve
78=solvent delivery pump
79=tank pump assembly
80=tank pump
80a=discharge port of tank pump
80b=suction port of tank pump
81=tank pump discharge conduit
82=three-way valve
83=solvent section conduit
84=waste fluid section conduit
85=wand
86=condenser
87=inlet water conduit
88=water pressure sensor
89=water return conduit
90=vacuum pump
91=solvent discharge conduit
92=solvent check valve
93=solvent delivery conduit
94=solvent priming conduit
95=flash-point-increasing agent delivery system
96=agent container
97=agent conduit
98=agent port
99=agent control valve
100=pressure conduit
101=controller
102=switch panel
103=drum cavity
104=first wall of drum cavity
105=second wall of drum cavity
106=rear wall of drum cavity
107=bottom wall of drum cavity
108=cavity door
109=gasket
110=light sensor
111=ultrasonic sensor
112=housing
113=upper wall of housing
114=support wall of housing
115=back wall of housing
116=front wall of housing
117=aperture of front wall
118=housing cavity
119=platform
120=sensor opening
121=solvent section pump assembly
122=suction conduit
124=reservoir
125=reservoir top wall
126=reservoir side wall
127=reservoir interior
128=sample cube
129=baffle section
130=cube conduit
131=baffle wall
132=reservoir conduit
133=waste fluid meter
134=solvent meter
135=solvent sight glass

DESCRIPTION OF THE PREFERRED EMBODIMENTS

For a fuller understanding of the nature and desired objects of this invention, reference should be made to the following detailed description taken in connection with the accompanying drawings. Referring to the drawings wherein like reference numerals designate corresponding parts throughout the several figures, reference is made first to FIG. 1. FIG. 1 of the drawings illustrates a modular solvent recovery device 30 made in accordance with the present invention operably connected in fluid communication with a conventional plate processor 22. The various component parts of the device 30 are mounted onto a frame 32 and enclosed within an enclosure 34 mounted to the frame 32. Enclosure doors (not shown) are strategically placed on the enclosure 34 to permit access therein to the component parts. The component parts of the device 30 are connected in operative fluid communication with the plate processor 22 through a solvent feed conduit 24 and a waste photopolymer fluid conduit 26. The solvent feed conduit 24 transports solvent from the device 30 to the plate processor 22, and the waste photopolymer fluid conduit 26 transports waste photopolymer fluid generated during plate making operations of the plate processor 22 to the device 30.

Solvents are employed in the plate processor 22 to dissolve portions of a synthetic polymeric resin plate exposed to light in a photopolymer plate making process. The plate making process that takes place in the plate processor 22 is conventional, is not a part of the present invention, and therefore is not described in detail. The waste photopolymer fluid received by the device 30 of the invention from the plate processor contains a mixture of the selected solvent and photopolymer solids consisting of acrylic elastomer resins and synthetic rubber. The photopolymer solids are soluble in the selected solvent.

With continued reference to FIG. 1 and referring additionally to FIGS. 2 through 5, the general arrangement of the device 30 is shown. The device 30 comprises a still 40, a heating assembly 65, a tank 70, a solvent delivery pump 78, a tank pump assembly 79, a condenser 86, a vacuum pump 90, a flash-point-increasing agent delivery system 95, a programmable controller 101, a switch cabinet 102, and a drum cavity 103.

The device 30 is provided with slits (not shown) through a portion of the enclosure walls 34 to permit air flow through the enclosure walls 34 and into the enclosure interior as gasses collected in the enclosure interior are exhausted from the enclosure 34 and the plate making room by an exhaust fan 36. A vacuum inlet of the exhaust fan 36 is operably connected to a suction hole 38 located beneath the still 40, and an exhaust hose 39 connected to an outlet of the fan 36. The exhaust hose 39 extends to a safe area outside the enclosure 34 and the plate making room in which the device 30 is located. Any gases that may collect inside the enclosure 34 are drawn through the suction hole 38 by the exhaust fan 36 and exhausted through the exhaust hose 38 to the safe area exterior to the enclosure 34. By providing the exhaust fan 36 and the exhaust hose 39 within the enclosure 34, the enclosure 34 qualifies as a Class 1, Division 2 enclosure, and no special rooms or areas are needed to be constructed or modified to house the device 30. This enables the device 30 to be housed in the plate making room itself with no changes being required of the plate making room.

Now, referring to FIGS. 1–4, 6–9 and 15–18, the still 40 comprises a sealable vessel having a still interior 41 accessible through a manhole 42 located at the top of the still 40. Extending outwardly from the still 40 at the manhole 42 is a annular flange 43. The flange 43 has an inner periphery 44 which is contiguous with the manhole 42 and a rim 45. During operation, the manhole 42 is sealed by a manhole device 46. The manhole device 46 has a closure 47 pivotally and telescopically mounted to the still adjacent the flange 43. Extending outwardly from the closure 47 is an arm 48 having a mounting cylinder 49 which pivotally and slidably engages a rod 50 extending outwardly from the still 40. Oppositely and rotatably mounted to the closure 47 are two spaced-apart wheels 51. Two spaced-apart tracks 52 extend upwardly from the still 40 proximate the flange 43 along the respective paths of the wheels 51 to engage the wheels 51 as the closure 47 pivots away from the manhole 42. At a proximal end 53 of the tracks 52 are rounded shoulders 54 positioned to engage the wheels 51 upon pivotal movement of the closure 47. As the closure 47 pivots, the wheels 51 engage the respective shoulders 54 and cause the closure 47 to vertically rise above the flange 43 and roll along the tracks 52 to clear the closure 46 from obstructing the manhole 42. Because the wheels 51 are oppositely disposed on the closure 47, the mounting cylinder 49 slides upwardly along the rod 50 with minimal binding. A stop 55 is mounted to one of the tracks 52 to engage the respective wheel 51 and prevent the closure 47 from pivoting beyond the still track 52. A handle 56 extends outwardly from the closure 47 to assist an operator in pivoting and raising the closure 47. The handle 56 is foamed covered for improved gripping capability by the operator. A gasket (not shown) is disposed between the closure 47 and the rim 45 to assist in sealing the closure 47 to the flange 43. A plurality of clamps 57 are pivotally mounted to the still 40 adjacent the flange 43 to releasably engage the closure 47 and contract the closure 47 into sealable engagement with the flange 43. Receivers 58 having U-shaped slots 59 are mounted to the closure 47. Pivotally mounted to the still 40 are threaded bolts 60 which are placeable into the slots 59. Matingly threaded wing nuts 61 are adjustably disposed on the bolts 60. Upon rotation of the nuts 61 in one direction, the nuts 61 respectively engage the receivers 58 and exert pressure against the receivers 58 to seal the closure 47 to the flange 43. Rotating the nuts 61 in the opposite direction releases the pressure and enables the bolts 60 to be pivoted and removed from the slots 59 so that the closure 47 may be unseated from the flange 43. Pivoting the closure 47 in the opposite direction from the stop 55, the wheels 51 rollingly engage the respective tracks 52 and disengage the tracks 52 at the shoulders 54, permitting the closure 47 to seat on the rim 45 of the flange 43 and seal the manhole 42.

The bottom of the still 40 is tapered toward a dump opening 62 at the center of the still 40 bottom. Mounted to the still 40 at the dump opening 62 is an actuatable dump valve 63 to control the release of any contents of the still 40. The dump valve 63 communicates with a residue container 64 positioned below the still 40, as illustrated in FIG. 9. By supporting the still 40 above the residue container 64, residue can be drained from the still 40 to the residue container 64 solely by gravitation, eliminating the need for a pump.

A heating assembly 65 heats the still 40 and the contents of the still interior 41. The heating assembly 65 includes an oil filled jacket 66 that substantially surrounds the exterior of the still 40. Electric heaters 67 are mounted to the exterior of the oil filled jacket 66 and heats the oil contained in the jacket 66. As the temperature of the oil contained in the jacket 66 is increased by the heater 67, the still 40 and the material contained in the still interior 41 are heated by conduction. Other equivalent heating assemblies may be employed with the present invention other than the heating assembly 65 shown.

A tank 70 is mounted to the frame 32 to store both solvent and waste photopolymer fluid. Within the tank 70 is a partition 71 which divides the tank 70 and forms a solvent section 72 and a waste fluid section 73. The solvent section 72 receives and holds the solvent, and the waste fluid section 73 receives and holds the waste photopolymer fluid. Significant space and fabrication cost savings are created by providing a tank 70 having such a configuration. Liquid level sight glasses 74 are operably mounted to the sections 72 and 73 to provide the operator with a visual indication of fluid levels within the respective sections 72 and 73. Drain valves 75 are respectively mounted to the sections 72 and 73 to manually empty or sample fluid contained within the sections 72 and 73. A waste fluid feed conduit 76 operably connects the waste fluid section 73 to the still 40 in fluid communication. An actuatable control valve 77 is disposed between the waste fluid section 73 and the still 40 within the waste fluid feed conduit 76 to control the volume of waste photopolymer fluid transferred from the waste fluid section 73 to the still 40. Waste photopolymer fluid is operably transported from the plate processor 22 through the waste photopolymer fluid conduit 26 to the waste fluid section 73 of the tank 70. The solvent feed conduit 26 is operably connected in fluid communication to the solvent section 72. A solvent delivery pump 78 is operably disposed within the solvent feed conduit 26 to draw solvent from the interior of the solvent section 72 and supply the solvent to the plate processor 22.

A tank pump assembly 79 is operably connected to the tank 70 to provide the operator with the ability to add solvent or waste photopolymer fluid to the device 30 from a source (not shown) independent of the plate processor 22. The tank pump assembly 79 has a tank pump 80 mounted to the frame 32 and a tank pump discharge conduit 81 mounted to a tank pump discharge port 80a of the tank pump 80. A three-way valve 82 is mounted to the tank pump discharge conduit 81 to provide fluid communication to the sections 72 and 73 of the tank 70. A solvent section conduit 83 is mounted to the three-way valve 82 and is operably connected to the solvent section 72, and a waste fluid section conduit 84 is mounted to the three-way valve 82 and operably connected to the waste fluid section 73. A hollow wand 85 is operably connected in fluid communication to a suction port 80b of the tank pump 80. The wand 85 is constructed of a flexible, solvent resistant material and is insertable into the source. Upon appropriate manipulation of the three-way valve 82 and by engaging the tank pump 80, either solvent or waste photopolymer fluid is drawn from the source and respectively delivered to the solvent section 72 or the waste fluid section 73, depending upon the contents of the source.

As shown in FIG. 2, a condenser 86 is operably mounted to the still 40 to condense solvent vapors produced in the still 40. The condenser 86 is supplied with cooling water from a water source external to the device 30. The cooling water is supplied by the water source through an inlet water conduit 87 extending between the water source and operably connected in fluid communication with the condenser 86. The supply of water through the inlet water conduit 87 is monitored by a water pressure sensor 88 that is operably connected to the control logic of the device 30. Additionally, the water temperature is monitored by a thermocouple probe (not shown) operably connected to the control logic of the device 30. In the event that the water pressure or temperature exceeds respective predetermined set point pressures or temperatures, the control logic of the device 30 terminates operation of the device 30. The cooling water passes through the condenser 86 to condense solvent vapor traveling through the condenser 86, and is returned to a water return conduit 89 external to the device 30 operably connected in fluid communication with the condenser 86.

Vacuum pressure is created in the still 40 by a vacuum pump 90 sufficient to draw waste photopolymer fluid from the waste fluid section 73 of the tank 70 through the waste fluid feed conduit 76 to the still 40. A solvent discharge conduit 91 communicates with the still interior 41 and extends from the still interior 41 through a solvent check valve 92 and the condenser 86 to the vacuum pump 90. The solvent check valve 92 provided in the solvent discharge conduit 91 ensures that fluid flow progresses in only one direction through the solvent discharge conduit 91. The vacuum pump 90 provided in the solvent discharge conduit 91 creates a vacuum pressure in the solvent discharge conduit 91 and the still 40. The vacuum pressure draws distilled solvent from the still interior 41, through the solvent discharge conduit 91 and the condenser 86, and the vacuum pump 90 supplies the distilled solvent through a solvent delivery conduit 93 to the interior of the solvent section 72 of the tank 70. A solvent priming conduit 94 operably connected to the solvent discharge conduit 91 and the solvent section 72 to supply solvent to the vacuum pump 90 as a coolant until sufficient distilled solvent flow is generated from the still 40 to fully charge and cool the vacuum pump 90.

Referring to FIGS. 4–9, a flash-point-increasing agent delivery system 95 is operably connected in fluid communication with the device 30 to provide a flash-point-increasing agent to a concentrated residue generated by distillation operation. As the still 40 distills the waste photopolymer fluid, solvent is removed from the still 40 and the waste photopolymer fluid is reduced to the concentrated residue. The desired solvent to be distilled may be any number of commercially available solvent blends, including the widely used prior art solvent blend of alcohol-perchloroethylene. Examples of some commercial solvents typically employed in plate making operations by plate processors 22 to dissolve portions of the photopolymer coated plate include solvents marketed under the trade names OPTISOL, distributed by DuPont Company; SOLVIT, distributed by Polyfibron Technologies, Inc.; and NUTRE CLEAN, distributed by NuPro Technologies. Although it is desirable to maximize solvent recovery from the waste photopolymer fluid, a portion of the solvent remains as a component of the concentrated residue. Due to the distillation operation, the mixture of the solvent, generally a Class III liquid, and the photopolymer remaining within the concentrated residue undergo chemical change, resulting in the concentrated residue having a flash point temperature between 100 and 140° F. Thus, the concentrated residue is a Class II residue. By mixing a flash-point-increasing agent with the concentrated residue, the flash point temperature can be raised to a predetermine temperature.

Under current regulatory definitions, it is desirable for the flash point temperature of the concentrated residue to be in excess of 140° F. Flash-point-increasing agents, such as heavy carrier oils, particularly paraffinic and naphthenic oils or a mixture thereof, bind the solvent and prevent solvent vapors from emitting from the concentrated residue, thereby raising the flash point temperature of the concentrated residue and curtailing a fire hazard created by tribal chain electrical reactions. By adding about 3 gallons of the flash-point-increasing agent to 100 gallons of waste photopolymer fluid, a concentrated residue is produced having a flash point temperature in excess of 140° F., which resultingly classifies the concentrated fluid residue as a Class III residue. The amount of flash-point-increasing agent needed to produce a concentrated residue having a predetermined or desired flash point temperature can vary, depending upon the solvent. As a result, distillation within the still 40 can be conducted at higher temperatures, if desired, to increase solvent recovery. Although the flash-point-increasing agent does not prevent the acrylic elastomer particles of the concentrated residue from coalescing, into a molten state, the agent lubricates the coalesced particles and prevents the particles from bonding and caking onto the still interior 41. Further, the agent acts as a carrier oil and temporarily maintains the coalesced particles in suspension, which allows more solvent to be removed from the still 40. Studies have shown that use of the agent have increased solvent recovery from approximately 97% to approximately 99% by volume of the solvent contained within the waste photopolymer fluid, while the concentrated residue maintains fluidity at elevated temperatures. However, once the concentrated residue cools, the residue becomes a solid, plastic mass. The concentrated residue is maintainable as a Class III liquid by reducing solvent recovery.

In the embodiment shown in FIG. 6, the flash-point-increasing agent is supplied from an agent container 96 operably connected to the still interior 41 through an agent conduit 97 connected in fluid communication to an agent port 98 on the still 41. An actuatable agent control valve 99 controls the amount of flash-point-increasing agent delivered to the still 40. Another wand 86 is utilized to operably connect the agent control valve 99 to the agent container 96. In another embodiment, shown in FIG. 7, the agent conduit 97 is operably connected in fluid communication with the waste fluid feed conduit 76, supplying the flash-point-increasing agent to the still 40. Yet, in the embodiment shown in FIG. 8, the agent conduit 97 is operably connected in fluid communication with the waste fluid section 73 of the tank 70, and the flash point increasing agent is supplied to the still 40 through the waste fluid section 73. Still, in the embodiment shown in FIG. 9, the agent conduit 97 is disposed to deliver the flash point increasing agent to the residue container 64 as the concentrated residue is dropped from the still 40 through the dump valve 63. Further, the flash-point-increasing agent can be added to the residue container 64 and mixed with the concentrated residue therein. In the event vacuum pressure is insufficient to draw the agent from the agent container 96 through the agent conduit 97 to the desired location, an agent pump (not shown) is placed in operable fluid communication with the agent conduit 97 may be utilized to deliver the agent.

Pneumatic pressure is supplied through a pressure conduit 100 to an auto pilot valve (not shown) and an pneumatically controlled valve (not shown) in response to a control command signal generated at the controller 101, which is operably connected to a switch panel 102, by control logic of the device 30. The auto pilot valve, the pneumatically controlled valve and their operative connection to the switch panel 102 of the device 30 are conventional and are not described in detail for the purpose of simplifying the description of the invention. The controller 101, preferably a programmable computer, is operably connected to all acutatable valves of the device 30 through the switch panel 102. Alternatively, solenoid controlled valves may be operatively connected with the switch panel 102 and opened and closed in response to command signals generated by control logic of the device 30.

The pneumatic pressure signals supplied through the pressure conduit 100 to operate the auto pilot valve are controlled in response to command signals generated by control logic of the device 30. The pneumatic pressure control signals also selectively activate the solvent delivery pump 78 to pump solvent through the solvent feed conduit 24 to the plate processor 22. Deactivating the solvent delivery pump 78 interrupts the supply of solvent through the solvent feed conduit 24.

Now, referring to FIGS. 3 and 10, positioned beneath the still 40 is a drum cavity 103 to receive the residue container 64. The drum cavity 103 comprises a first wall 104, a second wall 105, a rear wall 106 and a bottom wall 107. The suction hole 38 is disposed through the rear wall 106. Pivotally mounted to the frame 32 is a cavity door 108 which removably engages the first, second and bottom walls 104, 105 and 107. A gasket 109 is removably mounted to the cavity door 108 to assist in creating a seal between the cavity door 108 and the first, second and bottom walls 104, 105 and 107. The cavity door 108 has sufficient height to contain and hold the contents of the still 40 in the event of an undesired spill. Located on the first and second walls 104 and 105 are light sensors 110 operably connected to the controller 101 to detect the presence of the residue container 64. By placing the residue container 64 within the drum cavity 103, the residue container 64 interrupts the light beam emitting between the light sensors 110, permitting the dump valve 63 to open and drain the contents of the still 40. While the light sensors 110 detect the emitted light beam, the controller 101 prevents the dump valve 63 from actuating open.

Referring to FIGS. 1–4, 19 and 20, ultrasonic sensors 111 operably connected to the controller 101 are utilized to detect fluid levels in the solvent section 72, the waste fluid section 73 and the residue container 64. Housings 112 are provided to enclose each ultrasonic sensor 111. The housing 112 comprises a upper wall 113, two support walls 114 extending downwardly from the upper wall 113, a back wall 115 extending downwardly from the upper wall 113 and between the two support walls 114, and a front wall 116 extending downwardly and outwardly from the upper wall 113 and between the two support walls 114. The back wall 115 has an aperture 117 to receive the ultrasonic sensor 111. In combination, the upper, support, back and front walls 113, 114, 115 and 116 define a housing cavity 118 to receive and enclose the ultrasonic sensor 111. Disposed between the drum cavity 103 and the still 40 is a platform 119. Extending through the top of the solvent and waste fluid sections 72 and 73 and the platform 119 are sensor openings 120. The housings 112 are respectively mounted to the top of the solvent and waste fluid sections 72 and 73 and the platform 119 with the housing cavity 118 in conjunction with the sensor opening 120.

In operation of the device 30, waste photopolymer fluid containing a solvent desired to be distilled from the fluid and recovered is supplied from the plate processor 22 through the waste photopolymer fluid conduit 26 to the waste fluid section 73 of the tank 70.

Upon reaching a predetermined level of waste photopolymer fluid in the waste fluid section 73, the vacuum pump 90 is activated, creating a vacuum pressure in the still 40. After sufficient vacuum pressure is developed, the control valve 77 opens to permit a predetermined amount of waste photopolymer fluid to travel through the waste fluid feed conduit 76 to the still interior 41. After the predetermined amount of waste photopolymer fluid is received by the still 40, control logic of the device 30 causes a signal to be sent to the control valve 77, causing it to close and interrupt the supply of waste photopolymer fluid to the still interior 41. While waste photopolymer fluid is being supplied to the still interior 41, the controller 101 signals the agent control valve 99 to open to permit a supply of flash-point-increasing agent to travel through the agent conduit 97 to the waste fluid feed conduit 76 where the agent is commingled with the waste photopolymer fluid and supplied to the still interior 41. After a predetermined amount of the flash-point-increasing agent is supplied to the still interior 41, the control logic of the device 30 causes a signal to be sent to the agent control valve 99, causing it to close and interrupt the supply of flash point increasing agent to the still interior 41.

At this point in the operation of the device 30, the control logic of the device 30 controls the electric heaters 67 to heat the oil contained in the oil filled jacket 66 surrounding the still 40 to a desired temperature. The heated oil surrounding the still 40 heats the volume of waste photopolymer fluid and volume of flash-point-increasing agent supplied to the still interior 41 to the waste photopolymer fluid boiling point. Because the flash-point-increasing agent has a higher boiling point temperature than the solvent, the solvent is distilled out from the mixture of waste photopolymer fluid and flash-point-increasing agent, and the flash point increasing agent remains with the waste photopolymer fluid. A thermocouple (not shown) is provided in the still interior 41 to monitor the waste photopolymer fluid vapor temperature in the still interior 41 and provide an indication of the temperature to the operator at the controller 101 and to the control logic of the device 30 for safety monitoring of the temperature by the control logic. An auto-fill probe (not shown) is provided in the still interior 41 to monitor the level of the waste photopolymer fluid within the still interior 41 and provide a signal to the control panel and to the control logic of the device 30. The auto-fill probe detects the boiling action of the contents of the still interior 40. As the solvent is separated from the waste photopolymer fluid and removed from the still 40, the level of waste photopolymer fluid and the flash-point-increasing agent drops with in the still interior 41 and the boiling components fail to contact the auto-fill probe. A signal is sent to the controller 101 and the control logic of the device 30 from the auto-fill probe, and the control logic of the device signals the control valve 77 to open to permit additional waste photopolymer fluid to travel through the waste fluid feed conduit 76 to the still interior 41. Once the auto-fill probe detects the boiling components, control logic of the device 30 causes a signal to be sent to the control valve 77, causing it to close and interrupt the supply of waste photopolymer fluid to the still interior 41. The sequence of supplemental waste photopolymer addition to the still interior 41 continues until a total predetermined amount of waste photopolymer fluid is received by the still 40. Upon reaching the total predetermined amount of waste photopolymer fluid, the control logic of the device 30 prevents the control valve 77 from opening for the remainder of the device 30 distillation cycle. At this point in the operation of the device 30, the control logic of the device 30 begins the final cycle and continues distillation for a predetermined amount of time.

Operation of the vacuum pump 90 supplies vacuum pressure through the solvent discharge conduit 91 to the still interior 41. The increased temperature of the waste photopolymer fluid contained in the still interior 41 and the vacuum pressure supplied to the still interior 41 together cause the solvent contained in the waste photopolymer fluid to vaporize. However, the flash-point-increasing agent does not vaporize and remains with the waste photopolymer fluid in the still interior 41. The solvent vapor distilled from the waste photopolymer fluid is drawn through the solvent discharge conduit 91 by the vacuum pressure created by the vacuum pump 90. The solvent vapor is drawn through the condenser 86 where the vapor is condensed into a liquid. The liquid solvent is drawn from the condenser 86 through the solvent discharge conduit 91, the solvent check valve 92, and the vacuum pump 90 and is supplied by the vacuum pump 90 through the solvent delivery conduit 93 to the interior of the solvent section 72 of the tank 70 where the distilled solvent is collected and stored.

As the solvent is distilled from the waste photopolymer fluid contained in the still interior 41 becomes more concentrated and coalesces toward a soft, plastic, amorphous solid to form a concentrated residue. The flash-point-increasing agent prevents the concentrated residue from being completely reduced to an amorphous solid incapable of flowing out of the tank interior by suspending and lubricating the coalesced particles. Further, the flash-point-increasing agent lubricates the still interior 41 to prevent bonding and caking of the concentrated residue on the still 40 within the still interior 41.

At the conclusion of the predetermined amount of time for the final cycle, the control logic of the device 30 controls the electric heaters 67 to terminate heating the oil contained in the oil filled jacket 66 surrounding the still 40. At this point in the operation of the device 30, a control command generated at the controller 101 by the control logic of the device 30 signals the actuatable dump valve 63 to open, permitting the concentrated residue, a Class III residue, to drain in a molten state from the still interior 41 into the residue container 64 disposed within the drum cavity 103. Upon cooling, the concentrated residue, with the flash-point-increasing agent, becomes solid.

The solvent distilled from the waste photopolymer fluid and stored in the solvent section 72 of the tank 70 is drawn through the solvent feed conduit 24 out of the solvent section 72 by the solvent delivery pump 78 back to the plate processor 22 in response to a signal supplied to the controller 101.

When the residue container 64 is filled with concentrated residue and flash-point-increasing agent drained from the still interior 41, a signal is sent to the controller 101 by the ultrasonic sensor 111, preventing the dump valve 63 from opening until the operator empties or replaces the filled residue container 64. The contents of the filled residue container 64 are transportable and disposable as a Class III residue. Upon emptying and returning the residue container 64 to the drum cavity 103, the device 30 is enabled to operate in the above described manner.

Now, referring to FIGS. 11–14, the general arrangement of another embodiment of the device 30 made in accordance with the present invention is shown. In addition to the still 40, the heating assembly 65, the tank 70, the solvent delivery pump 78, the condenser 86, the vacuum pump 90, the flash-point-increasing-agent delivery system 95, the controller 101, the switch cabinet 102, and the drum cavity 103, this embodiment further comprises a solvent section pump assembly 121, a reservoir 124, a waste fluid meter 133 and a solvent meter 134. Except as described below, the components of the device 30 function and operate as previously described.

The solvent section pump assembly 121 is operably connected to the solvent section 72 of the tank 70 to provide the operator with the ability to add solvent to the device 30 from the source independent of the plate processor 22 and to mix solvent within the solvent section 72 to provide solvent having uniform quality. The solvent section pump assembly 121 has the tank pump 80 mounted to the frame 32, and the tank pump discharge conduit 81 mounted to the tank pump discharge port 80a of the tank pump 80. The tank pump discharge conduit 81 is operably connected in fluid communication with the solvent section 72 and is discussed further below. Mounted to the tank pump suction port 80b is a suction conduit 122. A recycle conduit 123 is mounted to one port of the three-way valve 82 and is operably connected in fluid communication with the solvent section 72, and the hollow wand 85 is mounted to another port of the three-way valve. The third port of the three-way valve 82 is mounted to the suction conduit to provide operable fluid communication to the recycle conduit 123 and the wand with the tank pump 80. By placing the three-way valve 82 in one position of fluid flow and by engaging the tank pump 80, solvent is drawn from the source and delivered to the solvent section 72 through the tank pump 80 and the tank pump discharge conduit 81. Alternatively, by placing the three-way valve 82 in the alternative position of fluid flow and by engaging the tank pump 80, solvent is drawn from the solvent section 72 through the recycle conduit 123 and recycled back to the solvent section 72 through the tank pump 80 and the tank pump discharge conduit 81. The recycling action of drawing and returning solvent creates turbulence within the solvent section 72 and mixes the solvent therein. By mixing solvent within the solvent section 72, uniform quality or consistent chemical makeup of the solvent is established.

With continuing reference to FIGS. 11 and 12 and particularly to FIG. 13, the reservoir 124 is mounted to the top of the tank 70 and has a reservoir top wall 125 and four reservoir side walls 126 extending downwardly from the reservoir top wall 125 to the tank 70 to define a reservoir interior 127. Disposed within the reservoir interior 127 is a sample cube 128 and a baffle section 129. The tank pump discharge conduit 81 is operably connected to the sample cube 128 to provide fluid communication with the tank pump 80. Extending upwardly through the top of the solvent section 72 into the sample cube 12 is a cube conduit 130. Mounted to the reservoir 124 and operably connected in fluid communication with the sample cube 124 is a sample port valve 75a from which samples of the solvent can be taken for quality determination. This valve 75a is vertically disposed below the upper most portion of the cube conduit 130. Solvent delivered from the tank pump 80 by the tank pump discharge conduit 81 accumulates within the sample cube 124 until the fluid level reaches the height of the upper most portion of the cube conduit 130, thereby maintaining solvent within the sample cube 124 for sampling. Two baffle walls 131 extend downwardly from the reservoir top wall 125 and are mounted to adjacent reservoir side walls 126 to form the baffle section 129. The lower most portions of the baffle walls 131 are vertically disposed above the top of the tank 70 to provide fluid communication between the interior of the baffle section 129 and the reservoir interior 127. The solvent delivery conduit 94 extends into the baffle section 129 and discharges solvent withdrawn from the still interior 41 by the vacuum pump 90. The baffle section 129 is provided to dampen turbulence created by solvent delivery from the solvent delivery conduit 93. A reservoir conduit 132 provides operable fluid communication between the reservoir interior 125 and the interior of the solvent section 72. The upper most portion of the reservoir conduit 132 is vertically disposed above the lower most portions of the baffle walls 131 to receive solvent from the non-turbulent region of the reservoir interior 127. Extending into the reservoir 124 is the solvent priming conduit 94.

As shown in FIGS. 11 and 14, the waste fluid meter 133 is operably connected to the controller 101 and is operably disposed in fluid communication with the waste fluid conduit 76 to measure the amount of waste photopolymer fluid drawn from the waste fluid section 73 of the tank 70 through the waste fluid conduit 76 and the control valve 77 and delivered into the still interior 41. During the operational cycle of the device 30, the control logic of the controller 101 records the flow rate of the waste photopolymer fluid and the cumulative amount of waste photopolymer fluid delivered to the still interior 41.

Referring to FIGS. 11, 12 and 14, the solvent meter 134 is operably connected to the controller 101 and is operably disposed in fluid communication with the reservoir conduit 132 to measure the amount of solvent drawn from the still interior 41 through the solvent discharge conduit 91, the condenser 86, the vacuum pump 90, the solvent delivery conduit 93, the reservoir 124 and the reservoir conduit 132 and delivered into the solvent section 72 of the tank 70. During the operational cycle of the device 30, the control logic of the controller 101 records the flow rate of the solvent and the cumulative amount of solvent delivered to the interior of the solvent section 72. A solvent sight glass 135 is operably disposed in fluid communication in the reservoir conduit 132 between the solvent meter 134 and the solvent section 72 to provide the operator with a visual indication of solvent flow into the solvent section 72.

In operation of this embodiment of the device 30, waste photopolymer fluid containing a solvent desired to be distilled from the fluid and recovered is supplied from the plate processor 22 through the waste photopolymer fluid conduit 26 to the waste fluid section 73 of the tank 70.

Upon reaching a predetermined level of waste photopolymer fluid in the waste fluid section 73, the control logic of the device 30 activates the vacuum pump 90, creating a vacuum pressure in the still 40. After sufficient vacuum pressure is developed, the control valve 77 opens to permit a predetermined amount of waste photopolymer fluid to travel through the waste fluid feed conduit 76 to the still interior 41. Also, the control logic of the device 30 activates the tank pump 80 to recycle the solvent within the solvent section 72 of the tank 70. A signal is sent from the waste fluid meter 133 to the controller 101 indicating the amount of waste photopolymer fluid being delivered to the still interior 41. After the predetermined amount of waste photopolymer fluid is received by the still 40, control logic of the device 30 causes a signal to be sent to the control valve 77, causing it to close and interrupt the supply of waste photopolymer fluid to the still interior 41. While waste photopolymer fluid is being supplied to the still interior 41, the controller 101 signals the agent control valve 99 to open to permit a supply of flash-point-increasing agent to travel through the agent conduit 97 to the waste fluid feed conduit 76 where the agent is commingled with the waste photopolymer fluid and supplied to the still interior 41. After a predetermined amount of the flash-point-increasing agent is supplied to the still interior 41, the control logic of the device 30 causes a signal to be sent to the agent control valve 99, causing it to close and interrupt the supply of flash point increasing agent to the still interior 41.

At this point in the operation of the device 30, the control logic of the device 30 controls the electric heaters 67 to heat the oil contained in the oil filled jacket 66 surrounding the still 40 to a desired temperature. The heated oil surrounding the still 40 heats the volume of waste photopolymer fluid and volume of flash point increasing agent supplied to the still interior 41 to the waste photopolymer fluid boiling point. As previously described, the solvent is distilled out from the mixture of waste photopolymer fluid and flash-point-increasing agent, and the flash-point-increasing agent remains with the waste photopolymer fluid. The thermocouple monitors the waste photopolymer fluid vapor temperature in the still interior 41 and provides an indication of the temperature to the operator at the control panel and to the control logic of the device 30 for safety monitoring of the temperature by the control logic. The auto-fill probe monitors the level of the waste photopolymer fluid with in the still interior 41 and provides a signal to the controller 101 and to the control logic of the device 30. A signal is sent by the auto-fill probe to the controller 101 and the control logic of the device 30 when the boiling fluids in the still interior 41 are no longer detected and the control valve 77 opens to permit additional waste photopolymer fluid to travel through the waste fluid feed conduit 76 to the still interior 41. The amount of additional waste photopolymer fluid delivered to the still interior 41 is measured by the waste fluid meter 133 and the cumulative amount of waste photopolymer fluid delivered to the still interior 41 is monitored by the control logic of the device 30. Once the auto-fill probe detects the boiling components, control logic of the device 30 causes a signal to be sent to the control valve 77, causing it to close and interrupt the supply of waste photopolymer fluid to the still interior 41. The sequence of supplemental waste photopolymer addition to the still interior 41 continues until a total predetermined amount of waste photopolymer fluid is received by the still 40. Upon reaching the total predetermined amount of waste photopolymer fluid, the control logic of the device 30 prevents the control valve 77 from opening for the remainder of the device 30 distillation cycle. At this point in the operation of the device 30, the control logic of the device 30 begins the final cycle which is controlled by the signal sent to the controller 101 by the solvent meter 134.

Operation of the vacuum pump 90 supplies vacuum pressure through the solvent discharge conduit 91 to the still interior 41. The increased temperature of the waste photopolymer fluid contained in the still interior 41 and the vacuum pressure supplied to the still interior 41 together cause the solvent contained in the waste photopolymer fluid to vaporize. However, the flash-point-increasing agent does not vaporized and remains with the waste photopolymer fluid in the still interior 41. The solvent vapor distilled from the waste photopolymer fluid is drawn through the solvent discharge conduit 91 by the vacuum pressure created by the vacuum pump 90. The solvent vapor is drawn through the condenser 86 where the vapor is condensed into a liquid. The liquid solvent is drawn from the condenser 86 through the solvent discharge conduit 91, the solvent check valve 92, and the vacuum pump 90 and is supplied by the vacuum pump 90 through the solvent delivery conduit 93 to the reservoir 124, the solvent meter 134, the solvent sight glass 135 and the interior of the solvent section 72 of the tank 70 where the distilled solvent is collected and stored.

As described above, the flash-point-increasing agent prevents the concentrated fluid residue from being completely reduced to an amorphous solid incapable of flowing out of the tank interior by suspending and lubricating the coalesced particles. Likewise, the flash-point-increasing agent lubricates the still interior 41 to prevent bonding and caking of the concentrated fluid residue on the still 40 within the still interior 41.

The solvent meter 134 measures the amount of solvent delivered to the solvent section 72 and the control logic of the device 30 monitors the cumulative amount of solvent delivered to the solvent section 72. Upon delivery of a predetermined amount of solvent to the solvent section, the control logic of the device 30 controls the electric heaters 67 to terminate heating the oil contained in the oil filled jacket 66 surrounding the still 40 and disengage the tank pump 80. At this point in the operation of the device 30, a control command generated at the controller 101 by the control logic of the device 30 signals the actuatable dump valve 63 to open, permitting the concentrated residue, a Class III residue, to drain in a molten state from the still interior 41 into the residue container 64 disposed within the drum cavity 103, wherein the residue solidifies upon cooling.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Further, the various components of the embodiments of the invention may be interchanged to produce further embodiments and are these further embodiments are intended to be encompassed by the present invention.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A process for manufacturing a concentrated residue from a waste photopolymer fluid produced by chemically etching a photopolymer layer of a printing plate with a solvent, the process comprising:
    distilling the waste photopolymer fluid to recover the solvent and concentrate the waste photopolymer fluid to form a concentrated residue having a flash point temperature; and
    mixing a flash-point-increasing agent with the waste photopolymer fluid prior to or during distillation or with the concentrated residue in an amount sufficient to raise the flash point temperature to a pre-selected flash point temperature.

2. The process as claimed in claim 1, wherein the flash-point-increasing agent is paraffinic oil, naphthenic oil, or a blend thereof.

3. The process as claimed in claim 1, wherein the flash-point-increasing agent is mixed with the concentrated residue after distillation.

4. The process as claimed in claim 1, wherein the flash-point-increasing agent is an oil.

5. The process as claimed in claim 1, wherein the pre-selected flash point temperature is at least 140° F.

6. A process for manufacturing a coalescable concentrated residue from a waste photopolymer fluid produced by chemically etching a photopolymer layer of a printing plate with a solvent, the process comprising:
    distilling the waste photopolymer fluid to recover the solvent and concentrate the waste photopolymer fluid to form a concentrated residue having a flash point temperature; and,
    mixing a flash-point-increasing agent with the waste photopolymer fluid prior to or during distillation or with the concentrated residue in an amount sufficient to maintain fluidity of the concentrated residue during distillation and raise the flash point temperature to a pre-selected flash point temperature.

7. The process as claimed in claim 6, wherein the flash-point-increasing agent is paraffinic oil, naphthenic oil, or a blend thereof.

8. The process as claimed in claim 6, wherein the flash-point-increasing agent is an oil.

9. The process as claimed in claim 6, wherein the pre-selected flash point temperature is at least 140° F.

10. A process for manufacturing a concentrated residue from a waste photopolymer fluid produced by chemically etching a photopolymer layer of a printing plate with a solvent, the process comprising:
    distilling the waste photopolymer fluid to recover the solvent and concentrate the waste photopolymer fluid to form a concentrated residue; and,
    mixing a flash-point-increasing agent with the waste photopolymer fluid prior to or during distillation or with the concentrated residue in an amount sufficient to maintain fluidity of the concentrated residue during distillation and raise the flash point temperature of the concentrated residue, wherein the concentrated residue is a class III residue.

11. The process as claimed in claim 10, wherein the flash-point-increasing agent is paraffinic oil, naphthenic oil, or a blend thereof.

12. The process as claimed in claim 10, wherein the flash-point-increasing agent is an oil.

13. A process for manufacturing a solid concentrated residue from a waste photopolymer fluid produced by chemically etching a photopolymer layer of a printing plate with a solvent, the process comprising:
    distilling the waste photopolymer fluid at a distillation temperature in a still to recover the solvent and concentrate the waste photopolymer fluid to form a concentrated residue;
    mixing a flash-point-increasing agent with the waste photopolymer fluid prior to or during distillation or with the concentrated residue; and,
    releasing the concentrated residue from the still at about the distillation temperature, wherein the concentrated residue solidifies without igniting when the concentrated residue is exposed to air.

14. The process as claimed in claim 13, wherein the flash-point-increasing agent is selected from paraffinic and naphthenic oils and a blend thereof.

15. The process as claimed in claim 13, wherein the flash-point-increasing agent is an oil.

* * * * *